United States Patent [19]

Cahill

[11] Patent Number: 5,443,767
[45] Date of Patent: * Aug. 22, 1995

[54] PROCESS FOR MOLDING A MULTIPLE STRUCTURE AND A CONTAINER MADE THEREIN

[75] Inventor: John W. Cahill, Yorktown Hts., N.Y.

[73] Assignee: PepsiCo., Inc., Purchase, N.Y.

[*] Notice: The portion of the term of this patent subsequent to Jul. 17, 2007 has been disclaimed.

[21] Appl. No.: 137,888

[22] Filed: Oct. 15, 1993

Related U.S. Application Data

[60] Continuation of Ser. No. 951,319, Sep. 25, 1992, abandoned, which is a continuation of Ser. No. 546,093, Jun. 29, 1990, abandoned, which is a division of Ser. No. 238,979, Aug. 25, 1988, Pat. No. 4,942,008, which is a continuation of Ser. No. 753,402, Jul. 10, 1985, abandoned.

[51] Int. Cl.$^6$ ............................................. B29C 49/20
[52] U.S. Cl. ............................................. 264/37; 264/513; 264/516; 264/266; 264/267
[58] Field of Search ................ 264/511, 512, 513, 516, 264/266, 267, 275, 279, 150

[56] References Cited

U.S. PATENT DOCUMENTS

| | | | |
|---|---|---|---|
| 2,959,812 | 11/1960 | Allen | 264/516 X |
| 3,029,468 | 4/1962 | Valyi | 18/5 |
| 3,091,000 | 5/1963 | Makowski | 18/59 |
| 3,207,822 | 9/1965 | Makowski | 215/12.2 X |
| 3,347,965 | 10/1967 | Valyi | 264/97 |
| 3,479,421 | 11/1969 | Armbruster et al. | 364/516 |
| 3,561,629 | 2/1971 | Turner | 215/1 C |
| 3,717,544 | 2/1973 | Valyi | 161/252 |
| 3,719,735 | 3/1973 | Valyi | 264/89 |
| 3,787,157 | 1/1974 | Valyi | 425/112 |
| 3,912,100 | 10/1975 | Graham | 215/12.1 |
| 3,948,404 | 4/1976 | Collins et al. | 215/1 C |
| 3,950,483 | 4/1976 | Spier | 264/328 |
| 3,955,697 | 5/1976 | Valyi | 215/1 C |
| 3,979,000 | 9/1976 | Karabedian | 215/12.1 |
| 4,013,748 | 3/1977 | Valyi | 264/266 X |
| 4,024,009 | 5/1977 | Amsden et al. | 156/272 |
| 4,033,929 | 7/1977 | Stiles et al. | 264/45.9 |
| 4,034,131 | 7/1977 | Rhoads | 428/35 |
| 4,038,446 | 7/1977 | Rhoads | 428/35 |
| 4,047,873 | 9/1977 | Farrell | 425/523 |
| 4,049,147 | 9/1977 | Stiles et al. | 215/12.1 |
| 4,061,705 | 12/1977 | Marcus | 264/89 |
| 4,067,949 | 1/1978 | Karabedian | 264/230 |
| 4,069,934 | 1/1978 | Karabedian | 2115/12.1 |
| 4,071,597 | 1/1978 | Karabedian | 264/230 |
| 4,122,142 | 10/1978 | Lawrence et al. | 264/97 |
| 4,138,026 | 2/1979 | Conklin | 215/12.1 |
| 4,140,236 | 2/1979 | Uhlig et al. | 220/71 |
| 4,172,873 | 10/1979 | Spicer | 264/230 |
| 4,187,276 | 2/1980 | Amberg | 264/515 |
| 4,189,517 | 2/1980 | Shanoski et al. | 428/423.7 |
| 4,190,168 | 2/1980 | Jacques | 215/12.1 |
| 4,205,028 | 5/1980 | Brueggemann et al. | 264/269 X |
| 4,212,910 | 7/1980 | Taylor | 428/35 |
| 4,215,460 | 8/1980 | Amberg et al. | 29/429 |

(List continued on next page.)

FOREIGN PATENT DOCUMENTS

| | | |
|---|---|---|
| 91275 | 10/1983 | European Pat. Off. . |
| 126575 | 11/1984 | European Pat. Off. ............ 215/12.1 |
| 1164855 | 5/1958 | France .................... 264/509 |
| 3017891 | 11/1981 | Germany . |
| 3145808 | 5/1983 | Germany . |
| 52-47860 | 4/1977 | Japan . |

(List continued on next page.)

Primary Examiner—Catherine Timm
Attorney, Agent, or Firm—Scully, Scott, Murphy & Presser

[57] ABSTRACT

An injection molding process for making a multiple layer, plastic structure. A plastic sleeve is placed and then enclosed in a mold cavity. A flowing heated plastic is conducted into the mold cavity, radially inside the sleeve, and forced radially outward against the sleeve. The flowing plastic forces the sleeve outward and forms, with the sleeve, an integrally bonded laminated structure. The mold is opened and the plastic structure is removed, and this structure may then be reformed to form a container particularly suitable for containing beverages, foods, cosmetics, pharmaceuticals and chemicals.

26 Claims, 3 Drawing Sheets

U.S. PATENT DOCUMENTS

| | | | |
|---|---|---|---|
| 4,219,124 | 8/1980 | Amberg | 215/12.1 |
| 4,237,675 | 12/1980 | Myers | 53/397 |
| 4,243,712 | 1/1981 | Hoheisel et al. | 428/35 |
| 4,244,914 | 1/1981 | Ranalli et al. | 264/115 |
| 4,248,030 | 2/1981 | Heckman | 53/397 |
| 4,254,170 | 3/1981 | Roullet et al. | 428/36 |
| 4,256,231 | 3/1981 | Cioc et al. | 215/1 C |
| 4,256,789 | 3/1981 | Sunzuki et al. | 428/35 |
| 4,267,143 | 5/1981 | Roullet | 264/516 |
| 4,276,986 | 7/1981 | Tsukada et al. | 215/1 C |
| 4,281,045 | 7/1981 | Sumi et al. | 428/516 |
| 4,281,769 | 8/1981 | Ignell | 215/12.1 |
| 4,288,478 | 9/1981 | Kinoshita et al. | 428/35 |
| 4,289,817 | 9/1981 | Valyi | 428/35 |
| 4,307,137 | 12/1981 | Ota et al. | 428/35 |
| 4,307,138 | 12/1981 | Powers et al. | 428/35 |
| 4,311,250 | 1/1982 | Rarve et al. | 220/458 |
| 4,320,083 | 3/1982 | Jakobsen | 264/531 |
| 4,323,411 | 4/1982 | Uhlig | 156/245 |
| 4,330,579 | 5/1982 | Ota et al. | 428/35 |
| 4,335,068 | 6/1982 | Hemery | 264/328.1 X |
| 4,342,399 | 8/1982 | Stirling | 215/12.2 |
| 4,356,142 | 10/1982 | Germanio | 264/557 |
| 4,357,191 | 11/1982 | Bullard et al. | 156/244.14 |
| 4,373,002 | 2/1983 | Petersen-Hoj | 428/213 |
| 4,390,573 | 6/1983 | Bullard et al. | 428/35 |
| 4,391,861 | 7/1983 | Nilsson | 428/35 |
| 4,394,915 | 7/1983 | Nelson | 215/12.1 |
| 4,405,400 | 9/1983 | Petersen-Hoj | 156/244.11 |
| 4,405,557 | 9/1983 | Lenhard | 264/515 |
| 4,420,454 | 12/1983 | Kawaguchi et al. | 264/512 |
| 4,421,804 | 12/1983 | Mori et al. | 428/35 |
| 4,426,427 | 1/1984 | Vieth et al. | 428/542.8 |
| 4,426,512 | 1/1984 | Barbe ert al. | 528/173 |
| 4,436,895 | 3/1984 | Barbe et al. | 528/288 |
| 4,444,613 | 4/1984 | Burmeister | 156/446 |
| 4,495,125 | 1/1985 | Hatakeyama et al. | 264/132 |
| 4,539,463 | 9/1985 | Piccioli et al. | 264/536 |
| 4,573,596 | 3/1986 | Slat | 215/12.1 |
| 4,585,679 | 4/1986 | Karabedian | 215/12.1 X |
| 4,587,073 | 5/1986 | Jakobsen | 264/296 X |
| 4,590,028 | 5/1986 | Rosenkaranz et al. | 264/154 |
| 4,591,066 | 5/1986 | Moen | 220/69 |
| 4,601,926 | 7/1986 | Jabarin et al. | 215/1 C X |
| 4,606,954 | 8/1986 | Rausing et al. | 215/1 C X |
| 4,610,366 | 9/1986 | Estes et al. | 220/672 X |
| 4,715,504 | 12/1987 | Chang et al. | 264/513 |
| 4,719,069 | 1/1988 | Reymann et al. | 264/296 |
| 4,743,479 | 5/1988 | Nakamura et al. | 428/35 |
| 4,764,403 | 8/1988 | Admera | 215/1 C X |
| 4,796,766 | 1/1989 | Clark | 215/1 C |
| 4,797,244 | 1/1989 | Sauer | 264/513 |
| 4,894,268 | 1/1990 | Greenwood et al. | 215/1 C X |
| 4,942,008 | 7/1990 | Cahill | 264/266 |

FOREIGN PATENT DOCUMENTS

| | | | |
|---|---|---|---|
| 56-16052 | 4/1981 | Japan . | |
| 59-039535 | 3/1984 | Japan | 264/516 |
| 59-091038 | 5/1984 | Japan . | |
| 61-189913 | 8/1986 | Japan . | |
| 63-000041 | 1/1988 | Japan | 264/516 |
| 1600554 | 10/1981 | United Kingdom . | |
| 2152424 | 8/1985 | United Kingdom . | |

PROCESS FOR MOLDING A MULTIPLE STRUCTURE AND A CONTAINER MADE THEREIN

This is a continuation of copending application Ser. No. 951,319 filed on Sep. 25, 1992, abandoned which is a continuation of copending application Ser. No. 546,093 filed on Jun. 29, 1990, now abandoned which is a divisional of copending application Ser. No. 238,979, filed Aug. 25, 1988, now U.S. Pat. No. 4,942,008, which is a continuation of prior application Ser. No. 753,402, filed Jul. 10, 1985, now abandoned.

BACKGROUND OF THE INVENTION

This invention generally relates to processes for manufacturing plastic structures and to containers made from those structures. More specifically, the invention relates to a process for manufacturing laminated plastic structures via an injection molding process and to containers, especially well suited for holding carbonated beverages, foods and chemicals, made from those plastic structures.

Plastic containers are often used to hold carbonated beverages, and in fact, their use for this purpose has steadily grown over the past few years. While many plastics may be used for carbonated beverage containers, polyethylene terephthalate (referred to herein as PET) has achieved a major role in this area because, when manufactured properly, it has many desirable characteristics such as low cost, light weight, durability and rigidity.

Most of the excellent physical properties of PET become evident only when the resin is stretch-molded into a bi-axially oriented condition, and the majority of PET bottles produced for carbonated beverages are manufactured by, first, molding a PET preform via an injection molding process, and second, reforming the preform into the final desired shape. With most PET containers a different machine is employed in each of these two manufacturing steps; however, a significant number of bi-axially oriented PET bottles are also formed in one apparatus having a plurality of positions or stations. Some PET containers not requiring high mechanical properties are produced via conventional injection blow molding and have little or no molecular orientation.

The major cost element in the manufacture of PET bottles is the cost of the PET resin itself. Accordingly, PET bottle suppliers are interested in decreasing the amount of PET resin in the bottles, and one way of doing this is to reduce the thickness of the walls of the bottles. There are lower limits, though, on the thickness of the sidewalls of PET bottles. In particular, PET is gas permeable; and when used to hold a carbonated beverage, the sidewalls of a PET bottle must be thicker than certain minimum sizes if the bottle is to meet industry standards relating to carbon dioxide retention levels. For example, as defined by the industry, the term "shelf life" for a carbonated beverage bottle is the time, in weeks, for the beverage to lose 15 percent of its original carbonation level, when stored at room temperature. The major carbonated soft drink manufacturers in the United States have established a requirement that a PET bottle larger than one liter, when used to package a carbonated soft drink, must have a shelf life of 16 weeks. Bottles less than one liter generally have had to compromise on a shelf life of about ten weeks.

One way to reduce the amount of PET in a bottle and also extend the shelf life thereof, is to use a laminated structure, where the bottle comprises a first layer formed from PET and a second layer formed from a material which has a very low gas permeability (referred to herein as a high gas barrier material).

The use of a laminated bottle structure is advantageous for other reasons as well. For instance, it is highly desirable to employ used plastic material in beverage containers. Such a use, first, would provide a productive outlet for the large number of plastic bottles that are currently simply discarded, and second, would reduce the cost of the materials needed to manufacture new bottles. Government regulations, however, do not allow reprocessed plastic to come into contact with products stored in beverage containers and, instead, require that only unused plastic materials come into contact with those products. One way to meet these regulations while still using reprocessed plastics in a beverage container is to form the container from a laminated structure with a first, outer layer made from the reprocessed material and a second, inner layer made from unused plastic material.

While there are several ways to form a bottle with a laminated structure, it is very desirable to use an injection molding process. Such a process, first, would require relatively few changes to the present processes used by many in the industry and thus could be readily adapted thereby, and second, would have the typical advantages associated with injection molding processes such as dimensional precision and high productivity. Heretofore, however, the art has not been able to develop a practical, efficient and cost-effective injection molding process for manufacturing large numbers of laminated PET bottles.

In part, this is due to the fact that with typical injection molding processes used to make plastic preforms, as a practical matter, it is necessary to make the preform with a slight axial taper. This taper allows the mold to open and permits the preform to be removed therefrom without breaking or tearing the preform. For example, with a prior art method of making a laminated, plastic preform using an injection molding process, a first plastic material is cut, preshaped into a tapered form and placed on a mold core rod. Then, a second, liquid plastic is injected around that rod, and the first and second plastic materials bond together to form the laminated structure. Because of the time and expense needed to preshape the first material into the desired, tapered form and to place it over the core rod of the mold, this general type of method is not believed to be a practical way to manufacture large numbers of plastic preforms. This process also results in the preshaped material being on the inside wall of the formed structure.

SUMMARY OF THE INVENTION

The general object of the present invention is to provide an improved injection-molding process for making laminated plastic structures and preforms.

A more specific object of this invention is to use a plastic sleeve in an injection molding process to form one or more layers of a laminated plastic preform without deforming the shape of the sleeve prior to placing the material in the mold and without requiring separate specific steps to shape the sleeve into a tapered form.

These and other objects are attained with an injection molding process for making a multiple layer plastic structure comprising the steps of placing a plastic sleeve in a mold, and closing the mold to enclose the sleeve in a mold cavity. A flowing, heated plastic is conducted into the mold cavity, and forced radially outward against the sleeve. The flowing plastic forces the sleeve outward, for example into an outwardly tapered shape, and forms, with the sleeve, an integrally bonded laminated structure. Once that structure is made, the mold is opened, and the structure is removed therefrom and if desired, reformed to form a container. The container so made comprises neck, side wall and bottom portions connected together to form a one-piece bottle. The side wall portion includes outside and inside layers, while the neck and bottom portions of the container consist of a single plastic material.

A DETAILED DESCRIPTION OF THE PREFERRED EMBODIMENTS

Figure 1:
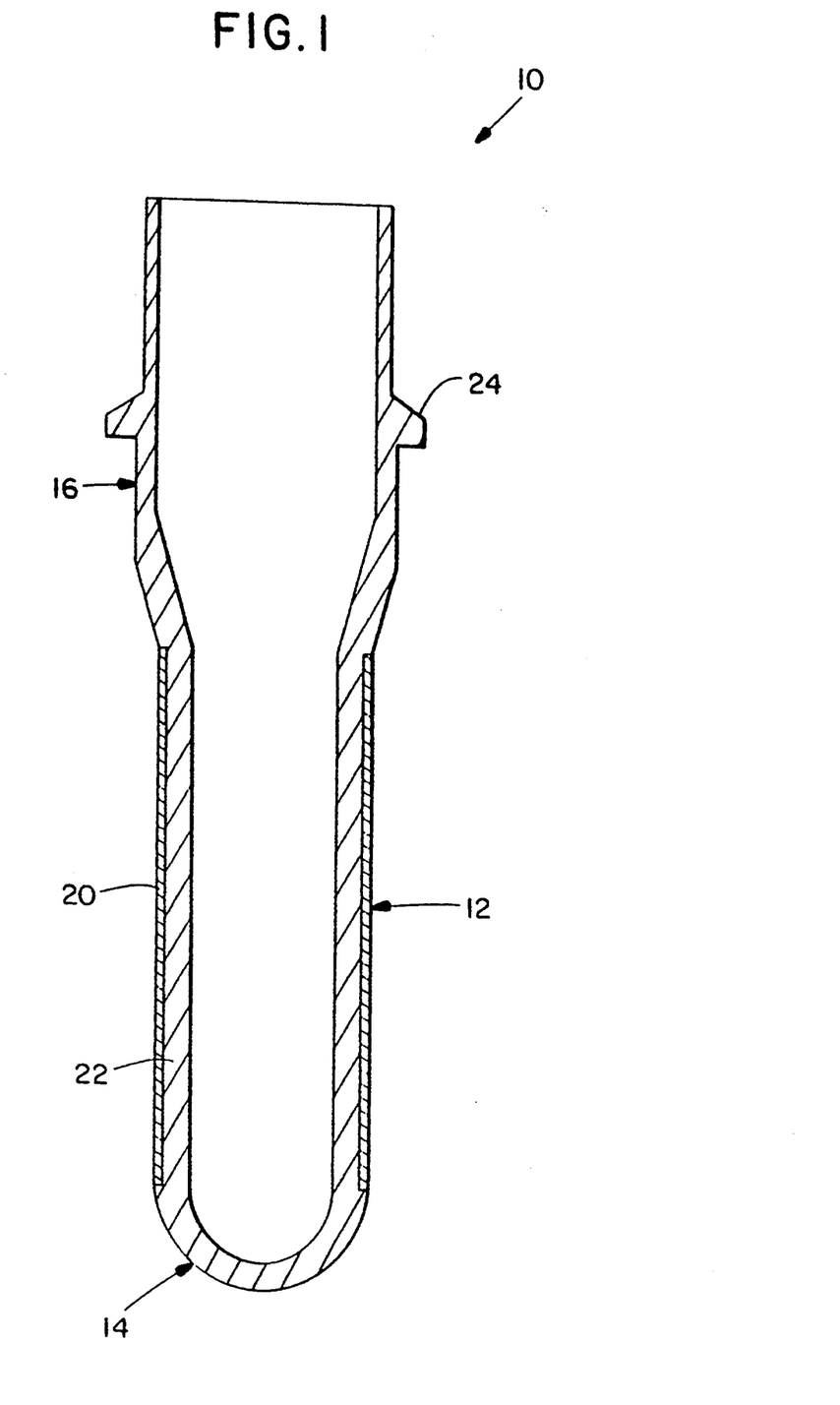
FIG. 1 is a side, cross-sectional view of a plastic preform made in accordance with the present invention.

FIG. 1 shows laminated preform 10 having a generally U-shaped cross-section and comprising side portion 12, bottom portion 14 and neck portion 16. Side portion 12 includes outer layer 20 and inner layer 22 that have been integrally bonded or fused together in the process described below. Bottom and neck portions 14 and 16, however, are not laminated and, instead, are each formed or consist of a single plastic material. As is conventional, neck portion 16 includes one or more threads 24 provided to receive a bottle cap after preform 10 has been expanded to form a container and the container has been filled with a beverage.

Figure 2:
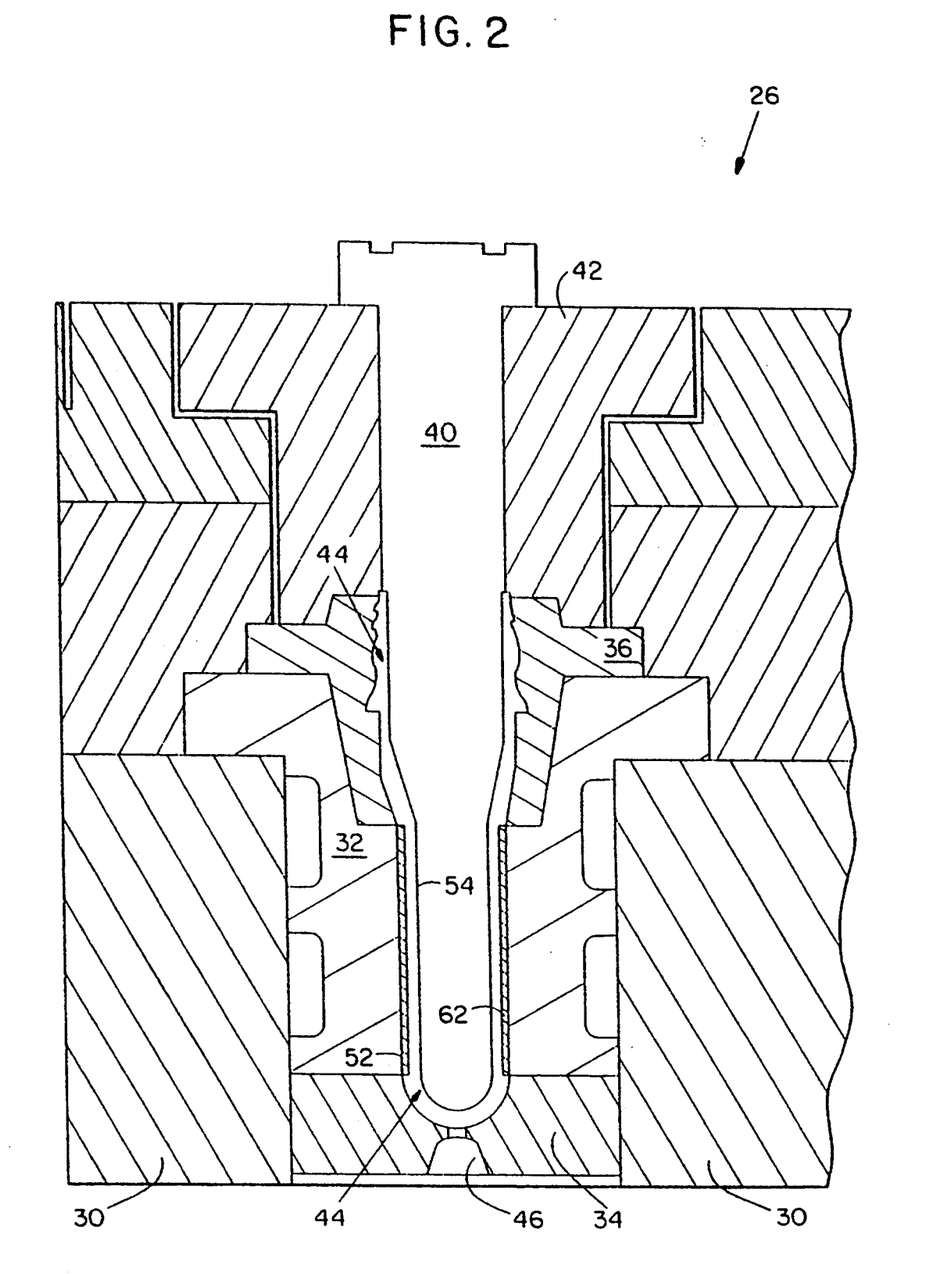
FIG. 2 is an axial cross-section through a mold which may be employed to manufacture the preform shown in FIG. 1.

FIG. 2 illustrates mold 26 for making preform 10. Mold 26 includes male and female subassemblies; and, in turn, the female subassembly comprises outside mold base 30, inside cavity block 32, end cap 34, and upper thread splits 36, and the male subassembly of mold 26 includes elongated rod 40 and support piece 42. Thread splits 36, cavity block 32, and end cap 34 form a cavity 44 in mold 26, and end cap 34 has a gate 46 for conducting liquid plastic into that cavity. FIG. 2 shows mold 26 in a closed position, wherein rod 40 extends into mold cavity 44. The shape of mold cavity 44 determines the shape of preform 10, and the mold cavity includes side, bottom, and neck portions that are used to form side wall 12, bottom 14, and neck 16 of the preform. As is conventional, mold 26 may be opened by moving apart the male and female subassemblies of the mold and removing rod 40 from cavity 44 of the mold.

Mold 26 is provided with suitable cooling fluid passages to ensure proper temperature control of the mold and the preform made therein. To facilitate opening mold 26 after a preform has been made therein, and to assist removing the preform from mold cavity 44, the substantially axially extending surface 52 of cavity block 32 and the opposing surface 54 of rod 40 slightly taper upwardly outwardly.

Figure 3:
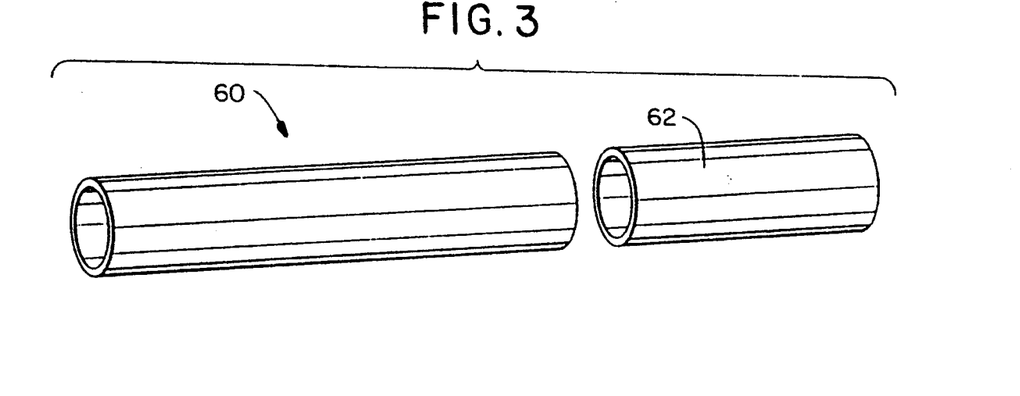
FIG. 3 is a perspective view of a tube from which a sleeve may be cut and then used to make an outer layer of the preform shown in FIG. 1.

FIG. 3 shows plastic tube 60 from which a sleeve 62 may be cut and then used to form outer layer 20 of the preform 10. To manufacture preform 10, sleeve 62 is cut from tube 60 and placed in the cavity 44 of mold 26, closely adjacent surface 52 of cavity block 32. This is done, it should be noted, when mold 26 is open-that is, prior to inserting rod 40 into mold cavity 44. Once plastic sleeve 62 is properly located in mold cavity 44, rod 40 is inserted thereinto and a flowing plastic material is injected into the mold cavity, via gate 46, radially inside the plastic sleeve. The plastic injected into cavity 44 via gate 46 is in a heated, liquid, pressurized state, and the heat and pressure of this plastic heats plastic sleeve 62 and forces that sleeve outward, into a shape conforming with the shape of the adjacent surface 52 of cavity block 32-that is, into a shape slightly tapering upwardly outwardly. At the same time, the heat and pressure of the liquid plastic also causes sleeve 62 to change into a plasticized state whereupon the liquid plastic fuses therewith to form an integrally bonded, laminated structure. After mold cavity 44 is filled, it is cooled to solidify preform 10, and mold 26 is opened and preform 10 is removed therefrom.

With an alternate procedure, molten PET may be flowed into cavity 44, to fill the cavity partially, before rod 40 is inserted thereinto. This may be done either prior to or after placing sleeve 62 in mold cavity 44, although it is believed preferable to conduct the flowing plastic into the mold cavity after the sleeve 62 is placed therein. In either case, once mold cavity 44 is partially filled with the molten PET and sleeve 62 is properly located in the mold cavity, mold 26 is closed and rod 40 is inserted into the mold cavity, forcing the molten PET radially outward against sleeve 62 to push that sleeve into the desired tapered shape and to make preform 10.

Thus, in accordance with the present invention with either of the above-discussed procedures, a laminated preform 10 is made using a pre-made plastic sleeve 62 to form an outside layer 20 of that preform, and it is not necessary to perform any specific, separate steps or operations on that sleeve to provide it with the desired, tapered shape in mold 26.

Figure 4:
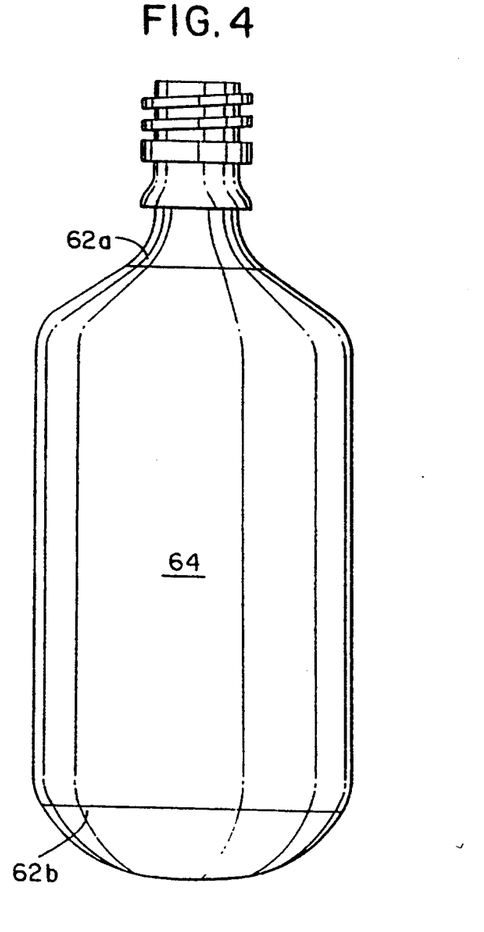
FIG. 4 is a side view of a bottle made from the preform illustrated in FIG. 1.

After being removed from mold 26, preform 10 is expanded to form bottle 64, shown in FIG. 4. The upper and lower edges of the layer of bottle 64 formed from tubular segment 62 are shown as 62a and 62b, respectively, in FIG. 4. Preform 10 may be expanded into bottle 64 in any suitable way. For example, in accordance with one conventional process, preform 10 is reheated, inserted into a second mold cavity, which conforms to the shape of the finished bottle 64, and then expanded outward against the surfaces of the second mold cavity by means of a pressurized fluid forced into the preform. This technique and others for expanding preform 10 are very well known in the field.

Also, it should be noted that preform 10 is heated and cooled during different stages of the process in which it is formed and expanded into bottle 64, and sleeve 62 may also be cooled or heated prior to insertion into mold cavity 44. Any suitable technique or techniques may be used to control the temperatures of preform 10 and sleeve 62, and numerous such methods are very well known to those skilled in the art.

Preferably, again with reference to FIG. 2, sleeve 62 is held axially stationary within mold cavity 44 as liquid plastic is forced against the sleeve. This may be done in several ways. For example, sleeve 62 may be forced into cavity 44 of mold 26, in a tight pressure fit against surface 52 of cavity block 32, and this pressure fit, by itself, may be used to hold the sleeve 62 stationary as the liquid plastic is forced against the sleeve. Alternately, mold 26 may include one or more shoulders (not shown) projecting slightly into cavity 44 to hold sleeve 62 in place. Such shoulders may extend into mold cavity 44 from lower portions of thread splits 36, for example. If this latter arrangement is employed to hold sleeve 62 in place in mold cavity 44, these shoulders are moved away from preform 10 prior to removing the preform from mold 26.

Figure 5:
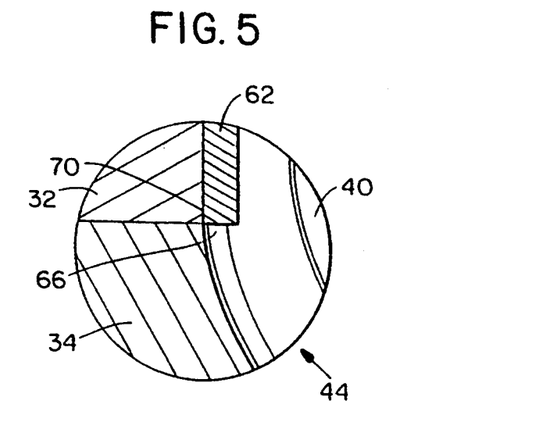
FIG. 5 is an enlarged view of a portion of the mold shown in FIG. 2.

With reference to FIG. 5, as liquid plastic is injected into mold cavity 44, the plastic tends to move upward, past the bottom of sleeve 62, before completely filling the space 66 immediately and directly below bottom edge 70 of the sleeve. Preferably, means are provided in mold 26 to vent air radially outward, away from mold cavity 44, from space 66 to allow the liquid plastic to flow into and eventually fill that space. Special apertures may be formed in mold 26 extending into communication with space 66 to vent air therefrom. Alternately, air in space 66 may be vented therefrom simply through an interface formed by two or more pieces of mold 26, and which is in communication with the space directly below edge 70.

Figure 6:
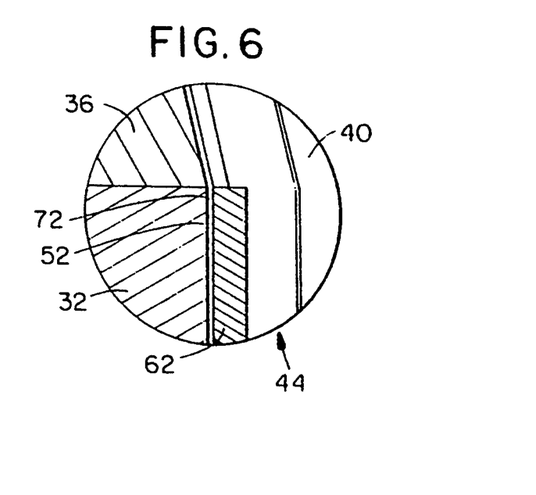
FIG. 6 is an enlarged view of another portion of the mold shown in FIG. 2, exaggerating the space between the sleeve placed therein and the adjacent surfaces of the mold.

With reference to FIG. 6, as the liquid plastic is injected into mold cavity 44, the plastic may move upward past the top edge of sleeve 62, before the sleeve expands outward to lie fully against the adjacent surface 52 of mold 26. Mold 26 may further include means to vent air radially outward, away from mold cavity 44, from the space 72 that is radially outside sleeve 62. This venting means allows sleeve 62 to expand into space 72 without requiring that the air therein pass through the liquid plastic material itself. Here too, special apertures may be formed in mold 26 extending into communication with space 72, or air from that space may be vented through an interface formed by two or more of the pieces forming the female subassembly of mold 26, for instance through the interface formed by thread splits 36 and inside cavity block 32.

Sleeve 62, from which outer layer 20 of preform 10 is made, may itself be made of various materials or multiple materials. For instance, the tube may be made from a material having a very low gas permeability, for example, a material comprising a diacid component comprising [thiobis(p-phenyleneoxy)]diacetic acid, [sulfonylbis(p-phenyleneoxy]diacetic acid, and mixtures thereof or polyesters blended with bisphenols. The use of such a material for outer layer 20 of preform 10 would enable a plastic bottle to be formed having a low gas permeability and with a reduced side wall thickness and, hence, a reduced total amount of material. Also, sleeve 62 may be made or formed from recycled material such as PET. With the process of the present invention, the inside surfaces of sleeve 62 are completely covered by the liquid plastic injected into mold 26 so that sleeve 62 itself will not come into contact with any product held in a container made from preform 10.

Sleeve 62 may be made in several ways and may comprise one or more layers of plastic. For example, as explained above, sleeve 62 may be cut from tube 60 which may be a mono layer plastic, or a multi-layer coextrusion. Preferably, tube 60 is formed by extrusion through a die, but it can be formed by other techniques such as by winding a sheet of plastic on a mandrel. Examples of multi-layer compositions are: reclaimed PET on a high gas barrier polyester: polypropylene/adhesive/ethylene vinyl alcohol co-polymer/adhesive; PET/adhesive/ethylene vinyl alcohol co-polymer/adhesive; Acrylonitrile co-polymer/adhesive; Polycarbonate/high barrier polyester; Polyamides/adhesives; and Polycarbonate/Polyetherimide.

For applications such as holding carbon dioxide inside a package, it is advantageous to have the layers of sleeve 62 integrally bonded together. However, in many applications where sleeve 62 is used to reduce the permeation of oxygen into a container, such as food packaging, a tight mechanical fit between layers of the sleeve is adequate. As shown in FIG. 3, sleeve 62 has a uniform circular cross section, but the sleeve may have any suitable shape.

In particular, the lower portion of sleeve 62 may slant radially inwardly, forming a conically shaped portion, or the lower portion of the sleeve may curve radially inwardly. Regardless of the specific shape of sleeve 62, when the sleeve is used with a mold where the heated plastic is injected into the mold via a gate located below the sleeve, preferably the sleeve has a lower or bottom opening to conduct that heated plastic into the interior of the sleeve. Sleeve 62 may be cut from tube 60 in any acceptable manner, or the sleeve may be formed with a shape and size appropriate for use in the present invention, eliminating the need for further shaping, cutting or reforming to use the sleeve in this invention.

Further, sleeve 62 may be used to provide bottle 64 with different colors, with specific designs, with colored stripes or with other desirable design features. For instance, sleeve 62 may be formed from a plastic differing in color from the flowing plastic conducted into mold cavity 44. Yet another embodiment could have plastic sleeve 62 formed with stripes of differing color, printed matter and/or decorations that are incorporated into the finished container 64, producing a prelabelled or predecorated container. Sleeve 62 may contain additives such as ultraviolet light absorbers, antistatic agents, or dye receptors to facilitate printing material or information on container 64.

While preferably liquid PET is injected into mold cavity 44 to form preform 10, a large number of other plastics may be used in the practice of this invention. These other materials include: polyhexamethylene adipamide, polycaprolactam, polyhexamethylene sebacamide, polyethylene-2,6- and 1,5-naphthalate, polytetramethylene-1,2-dioxybenzoate, and copolymers of ethylene terephthalate, ethylene isophthalate, polycarbonates, polyacrylates, polyolefins, vinyl polymer of nitriles, chlorine, styrene and other similar plastics polymers.

Preferably, the PET liquid is injected into mold cavity 44 at a temperature of between 500° F. to 575° F., and an internal coolant at 30° F. to 110° F. is passed through the cooling passages of mold 26. Preform 10 is cooled to below about 245° F. before being removed from mold 26.

Container 64 is well suited for many purposes. For instance, as discussed in detail above, container 64 is especially well adapted for holding carbonated beverages. The container may be heat set to improve the thermal stability of the container and make it suitable for packaging products, such as fruit juices or ketchup, that are commonly hot filled, as well as for packaging oxygen sensitive products such as beer. Moreover, the top portions of container 64 may be trimmed to yield a completely biaxially oriented container having a cylindrical shape with a closed end—the shape of a conventional metal can. The present invention is particularly well suited for forming such can-shaped containers because the position of the sleeve 62 can be controlled during the molding process so that it is not later trimmed off the container, maximizing the utilization of the material used to make sleeve 62.

In addition to container 64 and the modifications thereof previously described, the present invention may be effectively employed to manufacture other useful products. For instance, the invention may be used to make a container suited for packaging foods that can be reheated in the package using conventional or microwave ovens. Such a container can be made by using a sleeve formed from a high gas barrier resin and inserted into a mold cavity having the shape of a can. A molten polycarbonate is injected into the mold cavity to form a laminated structure that can be used as is or subsequently expanded into another final shape. This invention may also be used to mold structures having windows that can function as visual level indicators for products such as toothpaste in a pump dispenser.

The method of the present invention has several advantages compared to processes using multiple injections or coinjection of differing plastics. For instance, the use of sleeve 62 allows for a precise placement of the layer formed by the sleeve in the body of the article being molded. Further, use of a relatively cool sleeve 62 reduces the time required to cool the molten plastic conducted into cavity 44, and thus can result in increased productivity.

The process of this invention may be utilized to form laminate layers of a wide range of thicknesses, while multiple injection processes are normally limited to fairly thick layers. The tooling requirements and control of multiple or coinjection systems are usually much more complex and expensive than what is needed for the present invention. In addition, as a practical matter, structures formed by multiple injection or coinjection processes are limited to having two different plastic materials, while the process of this invention may be used to form structures having more than two different plastic materials.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. An injection molding process for forming a partially laminated preform for a beverage container comprising the steps of:
    (a) providing a plastic tube;
    (b) cutting off a portion of the plastic tube to form a hollow, plastic sleeve having an initial, generally hollow cylindrical shape and including a cylindrical side wall and first and second opposite, open axial ends;
    (c) providing a mold cavity having at least first, second and third cavity surfaces, said first cavity surface for forming a neck portion of said preform, said second cavity surface for forming a side wall portion of said preform and said third cavity surface for forming a bottom wall of said preform;
    (d) placing the plastic sleeve adjacent said second cavity surface such that at least a portion of the side wall of said sleeve is in firm contact with said second cavity surface for forming a preform having a laminated side wall portion;
    (e) closing the mold to enclose the sleeve in the mold cavity;
    (f) conducting a flowing, heated plastic into the mold cavity and through the first open axial end of the sleeve and into the interior thereof;
    (g) forcing the flowing plastic radially outward against the sleeve to force the sleeve outward from said initial shape and into a shape conforming with the shape of said cavity surface, and to form, with the sleeve, a preform having a neck portion, a bottom portion and an integrally bonded laminated sidewall portion;
    (h) opening the mold; and
    (i) removing the preform from the mold.

2. A process according to claim 1 wherein the conducting step includes the step of conducting the flowing plastic through the second open axial end of the sleeve.

3. A process according to claim 1 wherein the forcing step includes the step of forcing the sleeve into an outwardly tapered shape.

4. A process according to claim 3 wherein the step of forcing the sleeve into the tapered shaped includes the step of forcing the sleeve outward against an outside surface of the mold cavity.

5. A process according to claim 1 further comprising the step of holding the sleeve axially in place in the mold cavity during the forcing step.

6. A process according to claim 5 wherein the forcing step includes the step of venting air away from the mold cavity, from a space immediately below a bottom edge of the sleeve as the flowing plastic rises therepast.

7. A process according to claim 6 wherein the forcing step further includes the step of venting air away from the mold cavity, from a space radially outside the sleeve as the flowing plastic rises therepast.

8. A process according to claim 1 wherein the plastic sleeve has a low gas permeability.

9. A process according to claim 1 wherein the plastic sleeve is comprised of recycled polyethylene terephthalate.

10. A process according to claim 1, wherein the plastic tube is formed by an extrusion molding process.

11. A process according to claim 1, wherein the placing step includes the step of forcing a lower portion of the sleeve into a tight pressure fit against said cavity surface.

12. A process according to claim 6 wherein the mold forms an interface in fluid communication with the mold cavity, and wherein:
    the placing step includes the step of securing the sleeve in the mold cavity with the first axial end of the sleeve located immediately above said interface; and
    the venting step includes the step of venting air from the molding cavity and through said interface.

13. The process according to claim 6 wherein the mold forms first and second interfaces in fluid communication with the mold cavity, and wherein:
    the placing step includes the step of securing the sleeve in the mold cavity with the first axial end of the sleeve located immediately above said first interface, and with the second axial end of the sleeve located immediately adjacent said second interface;

the step of venting air from a space immediately below a bottom edge of the sleeve includes the step of venting air from the mold cavity and through said first interface; and the step of venting air from a space radially outside the sleeve includes the step of venting air from the mold cavity and through said second interface.

14. A combination extrusion, injection molding, and blow molding process for making a multiple layer, polyethylene terephthalate bottle for carbonated beverages, comprising the steps of:

extruding a polyethylene terephthalate tube;

cutting off a portion of said tube to form a hollow, plastic sleeve having an initial, generally hollow cylindrical shape and including first and second opposite, open axial ends;

placing the plastic sleeve in a mold forming a mold cavity and including an axially extending cavity surface forming at least a portion of the mold cavity, said cavity surface having a substantially cylindrical shape tapering axially outwardly, said substantially cylindrical shape having an inner diameter at its smaller end no greater than the outer diameter of said plastic sleeve and an inner diameter at its larger end greater than the outer diameter of said plastic sleeve, said placing of said plastic sleeve in the mold being carried out so as to position an end portion of said sleeve firmly in contact with said cavity surface;

closing the mold to enclose said sleeve in the mold cavity;

injecting flowing polyethylene terephthalate heated to a temperature in the range from about 500° F. to about 575° F. into the mold cavity and through the first open axial end of the sleeve and into the interior thereof, and forcing the flowing polyethylene terephthalate radially outward against the sleeve to force the sleeve outward against said cavity surface, to impart to said sleeve an axially tapering shape conforming with the shape of said cavity surface, and to form, with the sleeve, an integrally bonded laminated bottle preform;

opening the mold;

removing said bottle preform from said mold; and blow molding said preform into a bottle.

15. A process according to claim 14 wherein the conducting step includes the step of conducting the flowing plastic through the second open axial end of the sleeve.

16. A process according to claim 14 wherein the forcing step includes the step of forcing the sleeve into an outwardly tapered shape.

17. A process according to claim 16 wherein the step of forcing the sleeve into the tapered shaped includes the step of forcing the sleeve outward against an outside surface of the mold cavity.

18. A process according to claim 14 further comprising the step of holding the sleeve axially in place in the mold cavity during the forcing step.

19. A process according to claim 18 wherein the forcing step includes the step of venting air away from the mold cavity, from a space immediately below a bottom edge of the sleeve as the flowing plastic rises therepast.

20. A process according to claim 18 wherein the forcing step further includes the step of venting air away from the mold cavity, from a space radially outside the sleeve as the flowing plastic rises therepast.

21. A process according to claim 14 wherein the plastic sleeve has a low gas permeability.

22. A process according to claim 14 wherein the plastic sleeve is comprised of recycled polyethylene terephthalate.

23. A process according to claim 14, wherein the plastic tube is formed by an extrusion molding process.

24. A process according to claim 14, wherein the placing step includes the step of forcing a lower portion of the sleeve into a tight pressure fit against said cavity surface.

25. A process according to claim 19 wherein the mold forms an interface in fluid communication with the mold cavity, and wherein:

the placing step includes the step of securing the sleeve in the mold cavity with the first axial end of the sleeve located immediately above said interface; and the venting step includes the step of venting air from the molding cavity and through said interface.

26. The process according to claim 20 wherein the mold forms first and second interfaces in fluid communication with the mold cavity, and wherein:

the placing step includes the step of securing the sleeve in the mold cavity with the first axial end of the sleeve located immediately above said first interface, and with the second axial end of the sleeve located immediately adjacent said second interface;

the step of venting air from a space immediately below a bottom edge of the sleeve includes the step of venting air from the mold cavity and through said first interface; and the step of venting air from a space radially outside the sleeve includes the step of venting air from the mold cavity and through said second interface.

* * * * *

UNITED STATES PATENT AND TRADEMARK OFFICE
CERTIFICATE OF CORRECTION

PATENT NO. :   5,443,767
DATED      :   August 22, 1995
INVENTOR(S):   John W. Cahill It is certified that error appears in the above-indentified patent and that said Letters Patent is hereby corrected as shown below:

Column 10, line 5, Claim 17:  "shaped"  should read --shape--

Signed and Sealed this

Sixteenth Day of April, 1996

BRUCE LEHMAN

*Attest:*

*Attesting Officer*      *Commissioner of Patents and Trademarks*